Dec. 22, 1931.  B. WELSER  1,838,046
REVOLVING LIQUID SCREEN
Filed July 26, 1928   2 Sheets-Sheet 1

INVENTOR.
Brinton Welser
BY Barker & Collings
ATTORNEYS

Dec. 22, 1931.  B. WELSER  1,838,046
REVOLVING LIQUID SCREEN
Filed July 26, 1928   2 Sheets-Sheet 2
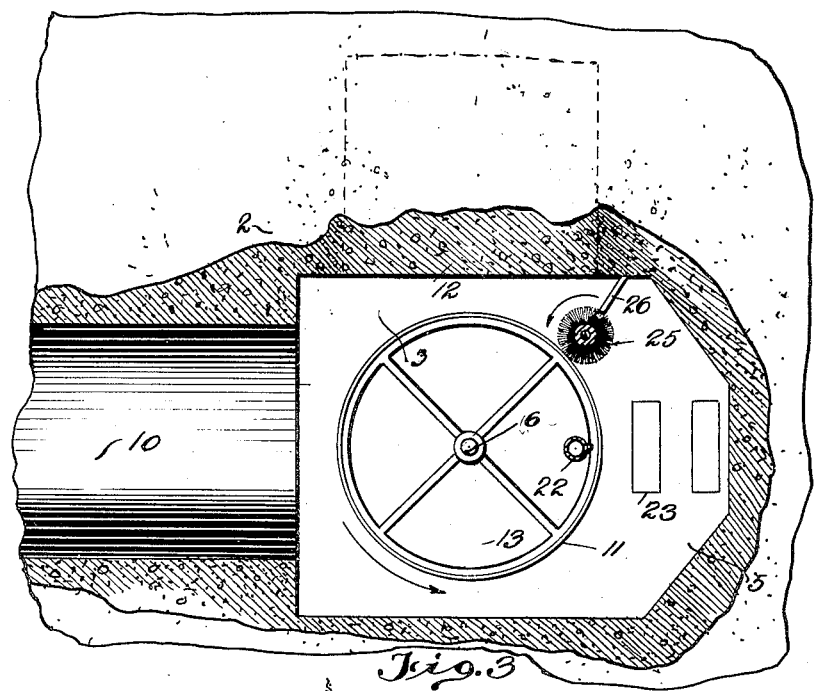
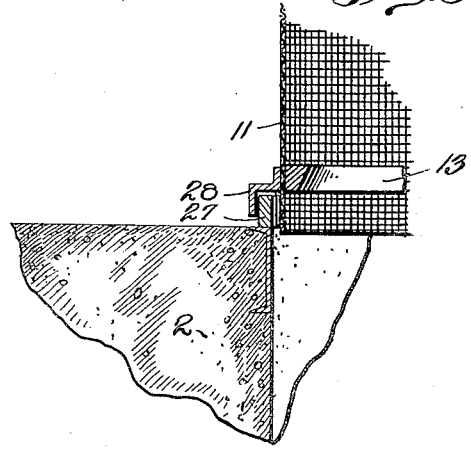
INVENTOR.
Brinton Welser
BY Barker & Collings
ATTORNEYS Patented Dec. 22, 1931

1,838,046

UNITED STATES PATENT OFFICE

BRINTON WELSER, OF MILWAUKEE, WISCONSIN, ASSIGNOR TO CHAIN BELT COMPANY, OF MILWAUKEE, WISCONSIN, A CORPORATION OF WISCONSIN

REVOLVING LIQUID SCREEN

Application filed July 26, 1928. Serial No. 295,531.

This invention relates to screens such as are employed to remove solid materials from sewage or from water used for industrial purposes; and it has for its object to provide an improved filtering mechanism of this kind that is of simple construction, easy and cheap to manufacture, that has few relatively movable parts, and may therefore be maintained in operation at a minimum of cost and with little wear and tear; that can be constructed to operate in water of any practical depth; that possesses large screening capacity within a comparatively small compass; that is easy to install, and has other features of advantage such as will be pointed out.

In the accompanying drawings, Fig. 1 is a vertical sectional view of a water screen embodying the present invention.

Fig. 2 is a horizontal sectional view thereof, on line II, II.

Fig. 3 is a vertical sectional detail view illustrating the water seal at the lower end of the screen.

Figure 1:
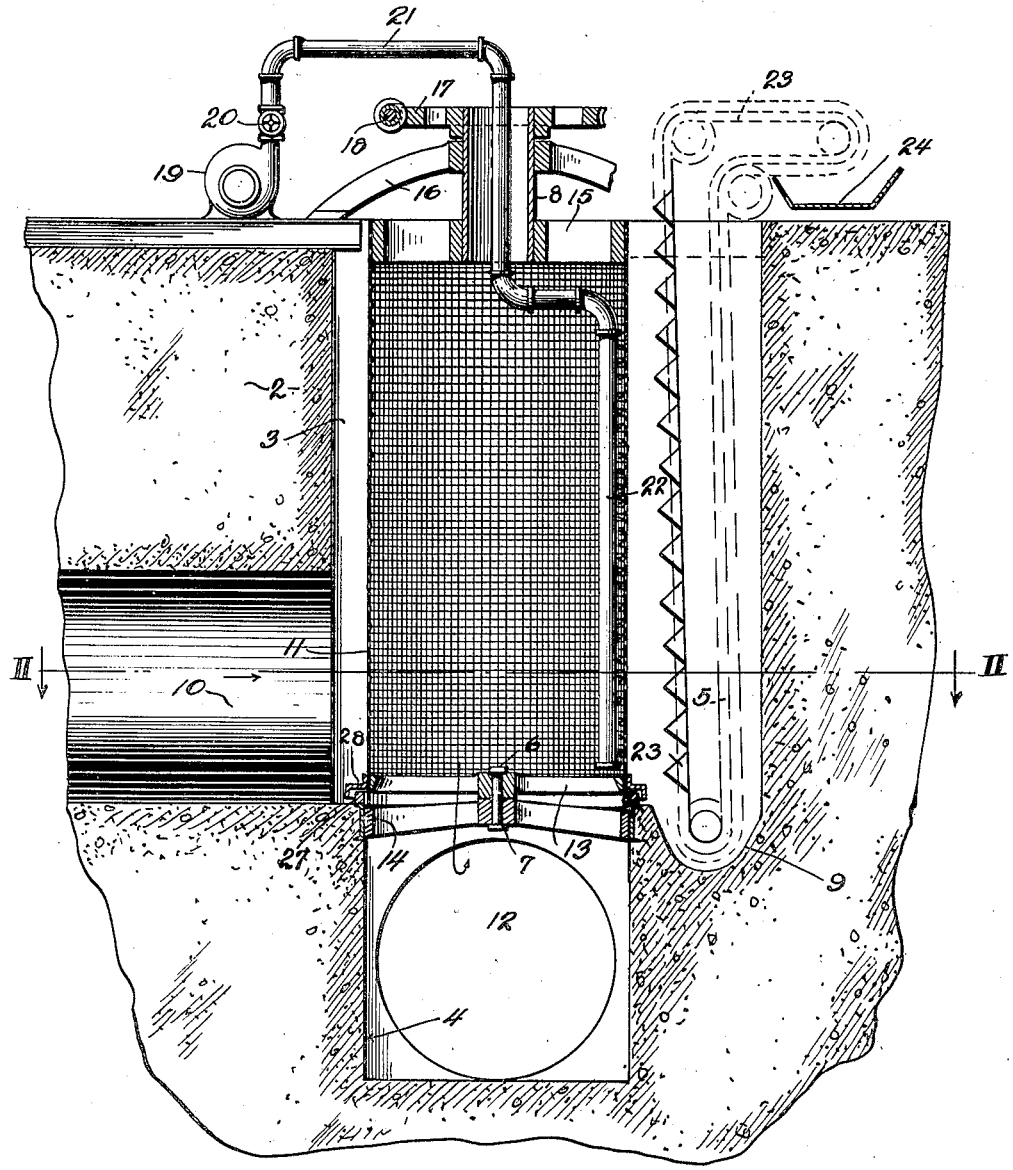

In the drawings the numeral 2 indicates the masonry or concrete foundation in which the screening apparatus is mounted. In this is formed a well 3, into which leads a supply duct 10 and from which leads a delivery duct 12, the latter duct being preferably at a lower level than the former, and leading from a lower extension, 4, of the well, located directly below the cylindrical, vertically arranged screen 11. To one side the well 3 is formed with an extension 5, in which is arranged the refuse conveyer 23.

The screen, 11, which, as has been stated, is cylindrical and set with its axis vertical, is rotatable, being supported at its lower end by a pin 6 seated in a stationary frame 14 set in the concrete 2 at the upper end of the lower extension, 4, of the well, which extension is of smaller transverse area than the portion 3 thereof, being preferably cylindrical and of a size in cross section approximating that of the screen 11. The pivot pin or bolt 6 passes through the hub of a spider 13 at the lower end of the screen to the rim of which spider is secured the lower edge of the cylindrical screen. The specific manner of constructing the screen constitutes no feature of the present invention and may be varied within wide limits. Suffice it to say it has a reticulated or screening surface suitably braced and supported. At the upper end of the screen is a spider 15, from which extends an upright hollow shaft 8 of rather large size, which is mounted so as to freely turn in a suitable frame 16 that is located above the upper end of the well 3. The shaft 8 carries, preferably above its bearing in the frame 16, a worm wheel 17 with which meshes a driving worm 18 mounted on a shaft driven from any suitable source of power. There is a trash seal or running joint between the outside of the lower end of the screen and the extension 4 of the screen well that serves to prevent any material of a size that should be removed by the screen from passing around the lower end of the screen, from the unscreened body of liquid in the well 3 to the screened body of liquid in the outlet extension 4. This seal or joint is represented as consisting of a stationary rim 27 (see Fig. 3) supported upon the floor of the well just outside the lower end of the screen and around the upper end of the chamber 4 for the screened water, and a close-running flange 28 overhaging such rim.

22 indicates a spray pipe located inside the screen close to the screening surface and extending practically the full length of the screen. It is connected with a pump 19 by a line of pipe 21 that extends lengthwise through the hollow shaft 8, permitting the screen to be rotated independently of the spray pipe. A valve 20 is located in the pipe line 21, permitting the water from the pump to be cut off from or delivered to the spray pipe at will.

The refuse conveyer 23 is located in the extension 5 of the well near to and at one side of the screen. It may be of any preferred construction adapted to receive the refuse collected by the screen and washed therefrom by the water spray from the pipe 22 and, lifting it from the well, deliver it to a trough 24, or other means for removing the refuse.

The operation of the apparatus is as follows: Water or other liquid bearing solid matter to be removed therefrom is admitted to the well through the conduit 10. The well may be filled with liquid to its top, or to the upper end of the screen should that not extend to the well top, or to any lower level, it being apparent that a screen made and arranged as herein illustrated is practically and effectively operative whether working to full capacity or not, that is with the well filled or only partially filled. Unscreened water entirely surrounds the screen so that the full circumference of the latter is utilized. It may either remain stationary or be revolved during the screening operations, as may be desired. The water that passes through the screen is cleaned and passes through the lower open end of the screen into the well extension 4, whence it passes out through the conduit 12.

To cleanse the screening surface, water at considerable pressure is discharged from the spray pipe 22 against the inside of the screen, and this operates to dislodge and wash off the refuse material that may have collected on the outer surface of the screen. The conveyor 23 is preferably of the endless bucket or cup type and is located in position to receive the dislodged refuse material in the buckets or other collecting devices with which it is provided and carry it away from the screen well, where it may be discharged into a trough or other device for removing it. The valve 20 permits the water spray to be either intermittently or continuously used as may be desired, but when the spray is in use the screen should be revolved. The labyrinthine trash seal at 27, 28, prevents the flow of unscreened water around the lower end of the screen, the parts 27, 28 being fitted to run close enough together to insure this. It will be seen by reference to Figure 3 that the screen-carried member, 28, of the trash seal is attached to the screen opposite a stiff ring formed by the rim of the spider 13 and thus has a substantial backing and a strong support. The screen, when supported as shown in the drawings, may come to have a wabbling motion at its lower end, through wear or other causes, and the trash seal may be utilized as a centering bearing to maintain the screen in proper working position, and it is, therefore, very important that the support for the ring 28, carried by the screen and overlapping the stationary ring 27, should be strong and rigid. Such support would not be furnished by the filtering material alone, of which the screen may be composed.

A revolving brush 25 may be used to supplement the water spray in cleaning the surface of the screen. A baffle 26 located between the brush 25 and the wall of the well is preferably used to prevent refuse that may be removed from the screen surface from being carried around past the brush and back into the well 3 to be again picked up by the screen.

What is claimed is:

1. In a screening apparatus, a well into which leads a conduit for the unscreened liquid, an extension of the well below the level of the said conduit, of a transverse area less than that of the well proper, from which leads another conduit for the screened liquid, a vertically arranged cylindrical screen located in the well in line with and directly above the aforesaid extension of the well, its interior communicating with the extension for the screened liquid, means for rotating the screen, a close-running joint constituting a labyrinthine trash seal between the lower submerged end of the screen and the wall of the well extension and a rigid ring carried by the screen near its lower end against which the screen-carried member of the trash seal is supported.

2. In a screening apparatus, a well into which leads a conduit for the unscreened liquid, an extension of the well below the level of the said conduit, of a transverse area less than that of the well proper, from which leads another conduit for the screened liquid, a vertically arranged cylindrical screen located in the well, in line with and directly above the aforesaid extension of the well, its interior communicating with the extension for the screened liquid, a frame extending across the well extension at its upper end, in which the lower end of the screen is pivotally supported, means for rotating the screen, a close-running joint constituting a trash seal between the lower submerged end of the screen and the floor of the well extension constituting the upper edge of the well extension and a spider at the lower end of the screen pivotally united at its hub with the said supporting frame and having a peripheral ring to which the filtering material of the screen is attached and which also serves as a rigid backing or support for the screen-carried member of the trash seal.

3. In a screening apparatus, a well into which leads a conduit for the unscreened liquid, an extension of the well below the level of the said conduit from which leads another conduit for the screened liquid, a vertically arranged cylindrical screen located in the well, its interior communicating with the extension for the screened liquid, pivotal axial supports for the screen, the upper one being hollow, and the lower one located in approximately the plane of the top of the well extension, means for rotating the screen, a close running joint constituting a trash seal located between the lower submerged end of the screen and the wall constituting the upper end of the aforesaid extension of the well and a cleaning spray device within the screen leading thereinto through the said upper hollow screen support.

4. In screening apparatus, a well into which leads a conduit for the unscreened liquid, an extension of the well below the level of the said conduit, of a transverse area less than that of the well proper, from which leads another conduit for the screened liquid, another extension of the well to one side thereof, a cylindrical screen turning about a vertical axis and located in the well, in line with and directly above the aforesaid extension of the well, its interior communicating with extension for the screened liquid, a close running joint constituting a trash seal between the lower submerged end of the cylindrical screen and the wall at the upper edge of the well extension, means for cleaning the surface of the screen and delivering the refuse removed into the side extension of the well and a refuse conveyer of the endless conveyer type located in the said side extension of the well and arranged to deliver outside thereof, for carrying away the removed refuse.

5. A liquid screening installation, comprising a well into which leads a conduit for the unscreened liquid, an extension of the well below the level of the said inlet conduit, from which leads an outflow conduit for the screened liquid, the transverse area of this extension being less than the transverse area of the inlet or receiving portion of the well, a vertically disposed cylindrical screen located in the well in line with the said outflow extension and with its lower edge closely adjacent to the upper rim of the said extension, the lower end of the cylinder being open, whereby its interior communicates freely with the well extension, and an overlapping, close-running labyrinthine trash seal between the lower edge of the screen and the upper edge of the well extension, consisting of a stationary ring supported by the floor of the well and circling the entrance to the extension thereof and a movable angular element concentric with the ring and projecting outwardly from the sides of the screen.

6. A coarse filter for trash-bearing liquid, comprising a vertically disposed rotating cylindrical screen supported in the body of liquid to be cleansed, its lower end being open and in free communication with the outlet for the screened liquid, a liquid projecting means located within the screen adjacent to the screening surface thereof arranged to project liquid against the inner screen surface in a direction counter to the normal flow of liquid through the screen, a brush revolving on a vertical axis and impinging against the outside surface of the screen cylinder in close proximity to the fluid projecting means, means arranged to segregate a portion of the body of liquid adjacent to the brush to prevent the material removed thereby from being again picked up by the screen, and a bucket conveyor located in the said segregated portion of the body of liquid to remove therefrom the material removed by the brush.

In testimony whereof I affix my signature.

BRINTON WELSER.